United States Patent [19]

Tandon

[11] Patent Number: 4,662,899

[45] Date of Patent: May 5, 1987

[54] AIR POLLUTION CONTROL SYSTEM METHOD AND APPARATUS

[75] Inventor: Jag S. Tandon, Northbrook, Ill.

[73] Assignee: American Environmental International Inc., Northbrook, Ill.

[21] Appl. No.: 720,100

[22] Filed: Apr. 5, 1985

[51] Int. Cl.⁴ ............................................. B01D 51/10
[52] U.S. Cl. ......................................... 55/80; 55/97; 55/213; 55/268; 55/316; 165/909
[58] Field of Search ................. 55/80, 84, 89, 97, 185, 55/186, 213, 261, 264, 316, 528, 268; 165/901, 913, 909, 111

[56] References Cited

U.S. PATENT DOCUMENTS

| | | | |
|---|---|---|---|
| 2,626,012 | 1/1953 | Persons | 55/213 |
| 2,838,287 | 6/1958 | Kuhner | 165/82 |
| 3,100,146 | 8/1963 | Huntington | 55/80 |
| 3,363,681 | 1/1968 | Revilock et al. | 165/909 X |
| 3,435,593 | 4/1969 | Nordone | 55/84 |
| 3,477,203 | 11/1969 | Luge et al. | 55/84 |
| 3,745,748 | 7/1973 | Goldfield et al. | 55/97 |
| 3,834,130 | 9/1974 | Bissada et al. | 55/316 |
| 3,905,784 | 9/1975 | Kelleher et al. | 55/31 |
| 4,078,390 | 3/1978 | Duvall | 55/21 X |
| 4,194,945 | 3/1980 | Malev et al. | 55/528 X |
| 4,239,511 | 12/1980 | Austermuhle | 55/84 |
| 4,257,783 | 3/1981 | Gutjahr et al. | 55/316 X |

OTHER PUBLICATIONS

Warring, "Filters and Filtration Handbook", 1981, pp. 218 to 220; and 408 and 409.

*Primary Examiner*—Charles Hart
*Attorney, Agent, or Firm*—Robert E. Wagner; Ralph R. Rath

[57] ABSTRACT

A pollution control system includes a condenser and filtering unit for removing vaporized organic solvents and particulate matter. The condenser includes baffles that define vertical flow paths, and hot exhaust gases are directed from above to alternate flow paths to flow downward while atmospheric air is directed upwardly through the remaining flow paths to cool the exhaust gses and the heated air is used to maintain the atmospheric air above a selected temperature. The filter unit includes a horizontal movable filter which is automatically replaced with a new filter section when the pressure differential across the filter exceeds a certain level.

6 Claims, 3 Drawing Figures

AIR POLLUTION CONTROL SYSTEM METHOD AND APPARATUS

DESCRIPTION

1. Technical Field

The present invention relates to the control of air pollution, and particularly to the removal of vaporized organic solvents and fine particulate matter from exhaust gas streams.

2. Background Prior Art

Substantial attention has been given in recent years to the control of air pollution, and particularly to the control of organic matter and fine particulate matter exhausted from high volume printing press drying operations. The contaminants emitted from such processes are typically in the form of aerosol resins, blue haze, smoke, hydrocarbons and odors contained in the exhausts.

Prior to the instant invention, several means have been attempted to alleviate the problem of air pollution in the printing industry. These means have included the development of inks having lower amounts of emittants, direct incineration of the exhuast stream at temperatures in the area of about 1500° F., catalytic incineration at lower temperatures, and electrostatic precipitation. While the latter three methods have been installed in plants to achieve recovery of heat thereby generated and/or utilized heat-saving accessories to reduce the operating cost of the processes, each has several disadvantages when compared to the present development.

The development of new ink blends has not been found to be cost effective. The new inks thus far produced have not been totally successful in reducing the emission of hydrocarbons and odors. Furthermore, the projected costs of developing new inks has been found by members of the printing industry to be less cost effective than the development of exhaust control systems.

Thermal incineration or after-burning has offered a viable solution to emission problems for several years. Burning of the exhaust gases for a proper period at a temperature in the range of 1300°-1500° F. has been found to meet the stringent regulatory requirements imposed by governmental agencies. More recently, however, with the increasing costs and decreasing availability of proper fuels for exhaust incineration, direct afterburning has become a less viable approach to controlling pollution from printing operations.

Catalytic incineration has become a recently popular means for eliminating or controlling exhaust emissions in the web-offset printing industry. Under catalytic incineration conditions, exhaust gases are burned at a temperature of 600°-800° F., and with proper heat recovery design and accessories, fuel consumption has been minimized. However, catalysts are generally replaced at least annually at a large expense in material and labor costs. Even though the high cost of replacement has been generally found to offset the cost of fuel consumption for direct incineration processes, catalytic incineration is also found to be only about 85 percent effective. Furthermore, it does not control odors. Consequently, the stringent air pollution requirements imposed upon the printing industry are frequently not met using catalytic incineration as a means for controlling the exhaust emissions.

Electrostatic precipitation with or without heat exchange or exhaust cooling has been used extensively in the printing industry as a means for controlling exhaust emissions and has not been found to be broadly useful where the exhaust stream contains vaporized liquid as well as particulate matter. In addition, chemical change of the vaporized organic liquids in the exhaust stream has been found to occur to produce potentially harmful aromatic compounds. Furthermore, electrostatic precipitation of particulates which also contain hydrocarbons causes the precipitator to foul more readily, and thus creates severe maintenance problems.

Thus, it can be seen that a low cost and highly efficient means for controlling exhaust stream pollutants would be a benefit to the industry.

SUMMARY OF THE INVENTION

According to the present invention, a system for removing vaporized organic solvent and fine particulate matter from a hot exhaust stream is provided. This system includes a heat exchanging condenser which can operate using outside air as a cooling agent to cool the exhaust stream and to condense the vaporized organic solvent therein into at least an aerosol particle mist within the exhaust stream. Downstream and operably associated with the condensing means is a self-draining mist coalescing filter which receives and passes through the cooled exhaust stream. The mist coalescing means defines a confined flow passageway for the exhaust stream and includes a substantially horizontal planar coalescing filter element which extends across the passageway transverse to the flow direction of the cooled exhaust stream. A first exhaust stream deflector means guides the exhaust stream downwardly to the coalescing filter element, while a second exhaust stream deflecting means guides the exhaust stream leading from the coalescing filter or element in a direction away from vertical. A drain means is also supplied for transporting away mist particles which are coalesced by the coalescing element. A fan is also provided for moving the exhaust stream through the system, and is located on the clean air side.

The coalescing filter of the above-described system is a fibrous web for coalescing the organic solvent aerosol particles in the exhaust stream into liquid droplets which may then be carried away by the above drain means. The coalescing element is subtantially planar and is impervious to the organic solvents of the system. The fibers of this web are bonded to each other predominantly at places of fiber-to-fiber contact, with the longest dimension of the fibers being substantially within the plane of the web and generally normal to the direction of flow of the exhaust stream through the web. In preferred practice, the web fibers are made from polyester, polypropylene, nylon or glass, and have an average diameter of from about 11 to about 40 microns, with a filter weight in the range of about 5 ounces per square yard to about 28 ounces per square yard and a material thickness of 3/32" to 3/8".

In utilizing the system of this invention, the exhaust stream, at a temperature of between about 100° F. and 600° F. or more and containing the vaporized organic solvent and fine particulate matter, is cooled to a temperature of less than about 100° F. to condense the vaporized organic solvent at least into aerosol particles which are substantially suspended within the exhaust stream in the form of a mist. Thereafter, the cooled particle-containing exhaust stream is passed into the substantially planar fibrous web so that the solvent mist particles and fine particulate matter contact the fibers of the web; the plane of the web being generally normal to the direction of passage of the exhaust stream. The particle-containing exhaust stream is maintained in contact with the web fibers until the solvent mist and fine particles are substantially removed from the exhaust stream by filtration through the fibers to thereby provide a cleaned exhaust stream. The separated solvent upon the wetted fibers is agglomerated by gravity flow, particularly at places of fiber-to-fiber contact, into liquid solvent droplets which are then collected in lower drains while the cleaned exhaust stream is emitted to the atmosphere.

According to one aspect of the invention, the heat exchanger condenser design is such that the solvent-containing exhaust stream enters the condenser at the top and flow down and carries with it the condensed solvents, thus aiding in the gravity flow of solvents to the drain at the lower end of the condenser. Additionally, the heat exchanger condenser is an all-welded construction unit with a plate spacing of one-half inch.

The system also incorporates controls for maintaining the cooling air above a predetermined temperature. The cooling air is blended with warm air exiting from the condenser to preheat the air when necessary so that cooling air temperature entering the condenser never falls below 30° F. This arrangement of the plates and reverse flow of air eliminates tar and varnish build-up caused by the vaporized organic solvent-containing exhaust stream on the apparatus.

Use of the various embodiments of this invention provides air pollution control, which is both inexpensive to install and to maintain and operate.

Another benefit of this invention is that it is possible to remove more than 97% of the vaporized organic solvent and fine particulate matter originally present in the exhaust stream prior to emitting the exhaust stream to the atmosphere.

Another advantage of the present invention is that the coalescing filter element may be automatically changed to provide a fresh coalescing filter element when the previously used element becomes fouled, as with particulate matter.

Yet another advantage of the present invention is that those areas of the apparatus which tend to become fouled with tars and varnishes remain clean automatically, thereby eliminating the amount of down-time of the printing machinery to clean the exhaust system.

Still other benefits and advantages of the present invention will be apparent to those skilled in the art from the detailed description hereinafter.

BRIEF DESCRIPTION OF SEVERAL VIEWS OF DRAWINGS

In the accompanying drawings forming a part of the specification, and in which like numerals are employed to designate like parts throughout the same, FIG. 1 is an elevational view of the components of the control system of the present invention;

FIG. 2 is a schematic diagram of an embodiment of the system for removing vaporized solvents from a hot exhaust stream of this invention in which arrows indicate the direction of flow within the system; and, FIG. 3 is an enlarged view of the filtering system which forms parts of the control system of FIG. 1.

DETAILED DESCRIPTION

Figure 1:
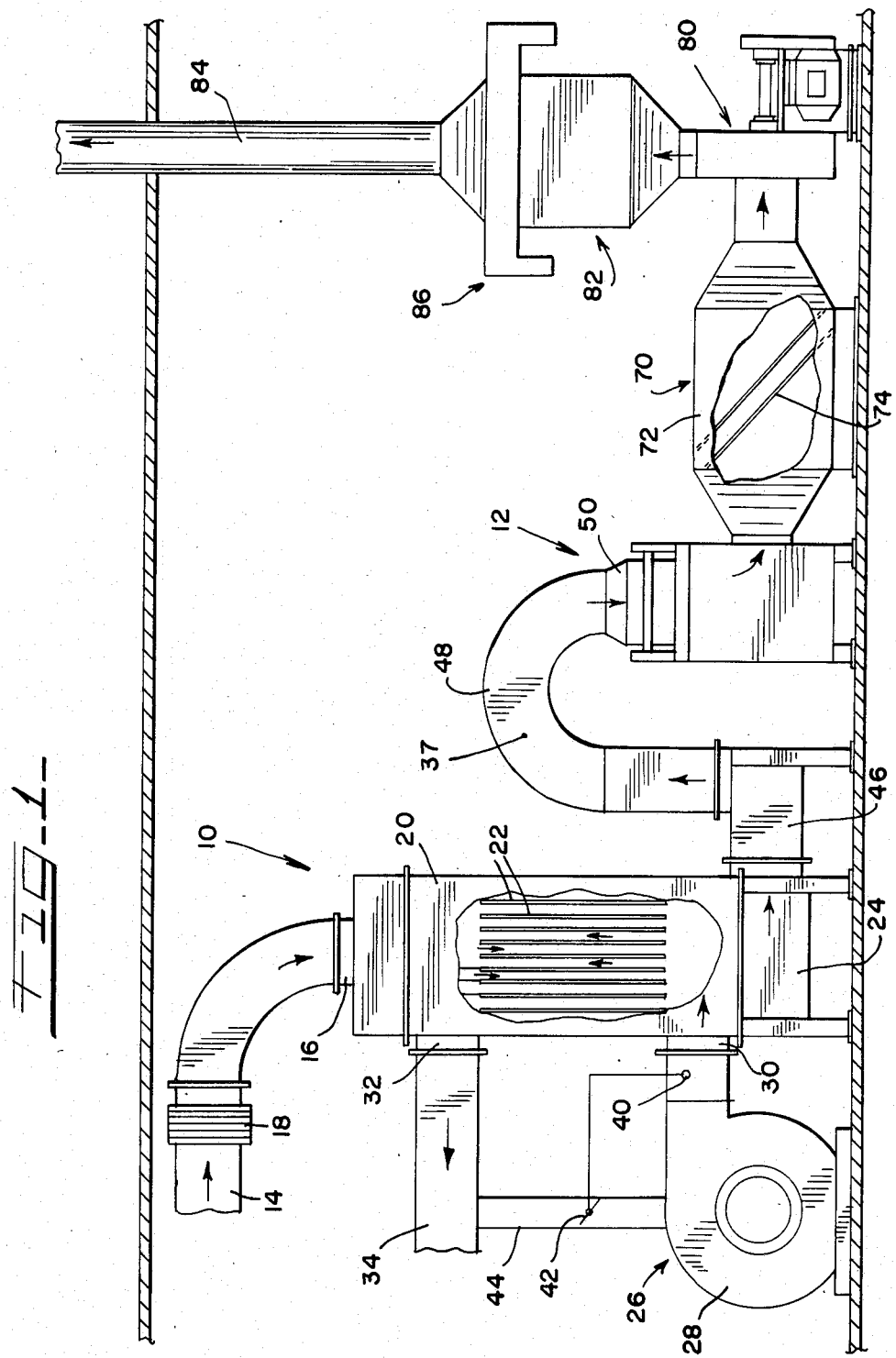

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings shows the air pollution control system constructed in accordance with the teachings of the present invention and including a condenser unit or means 10, and a primary filtering unit 12. Hot dryer exhaust gases are delivered through conduit 14 to the inlet 16 at the upper end of the condenser or heat exchanger 10. A pre-filter unit 18 may be located in conduit 14 to remove solid particles from the exhaust gases or stream.

The heat exchanger 10 consists of a housing 20 having a plurality of parallel planar-spaced plates 22 extending vertical to define a plurality of narrow, elongated vertical flow paths in the heat exchanger 10. Alternate flow paths defined by the plates 22 are in communication with the inlet 16 to divide the hot exhaust gases entering the inlet 16 into a plurality of individual streams directed downwardly towards the lower outlet end 24 of the condenser 10. The remaining flow paths defined by the plates 22 are in communication at the lower end with a source of atmospheric air, generally designated by reference numeral 26. The atmospheric air or pressurized fluid supply means 26 is in the form of a blower 28 having its outlet 30 connected to the lower end of the condenser and in communication with the lower ends of the alternate flow paths so that the atmospheric air is directed upwardly to an outlet 32.

Thus, the heat from the hot exhaust gases entering the inlet 16 is transferred through the plates 22 to the atmospheric air entering through the lower end of the heat exchanger or condenser, and this heated atmospheric air is then directed to a desired location within the plant through a conduit 34. The hot exhaust gases from the dryer are therefore cooled down to a temperature of less than about 100° F., while the vaporized organic solvents are condensed into aerosol particles which are moved towards the lower outlet end 24, and this movement is aided by gravity because of the vertical arrangement of the condenser, particularly the spaced plates 22. Some of the condensed organic solvents will be removed by the aid of gravity adjacent or at the exit end 24 of the condenser, where they are collected and returned to a solvent tank, as will be explained later.

Under certain climate conditions, the ambient temperature may approach or exceed 100° F., which would make it impossible to cool the hot exhaust gases below 100° F. For this purpose, a temperature sensor 37 is positioned in the path of the exhaust gases downstream of the heat exchanger 10 which sensess the temperature of the exhaust gases. If the temperature of the exhaust gases exceeds 100° F., sensor 37 operates a valve (not shown) to introduce a mist of atomized plant water into the air exiting through the blower outlet 30 to cool the atmospheric air entering the heat exchanger 10.

According to one aspect of the invention, the system also incorporates a means for maintaining the ambient air delivered to the heat exchanger or condenser above a predetermined level, when the system is operated in extremely cold environments. Thus, an air temperature sensor 40 is located in the outlet 30 for blower 28 and senses the temperature of the air delivered to the lower end of the condenser. This temperature sensor is connected to a damper 42 located within a conduit 44 extending from conduit 34 to the inlet of blower 28. The sensor 40 will automatically open and close damper 42 and cooperate to maintain the temperature of the air delivered from blower 28 above a temperature of about 30° F.

Figure 3:
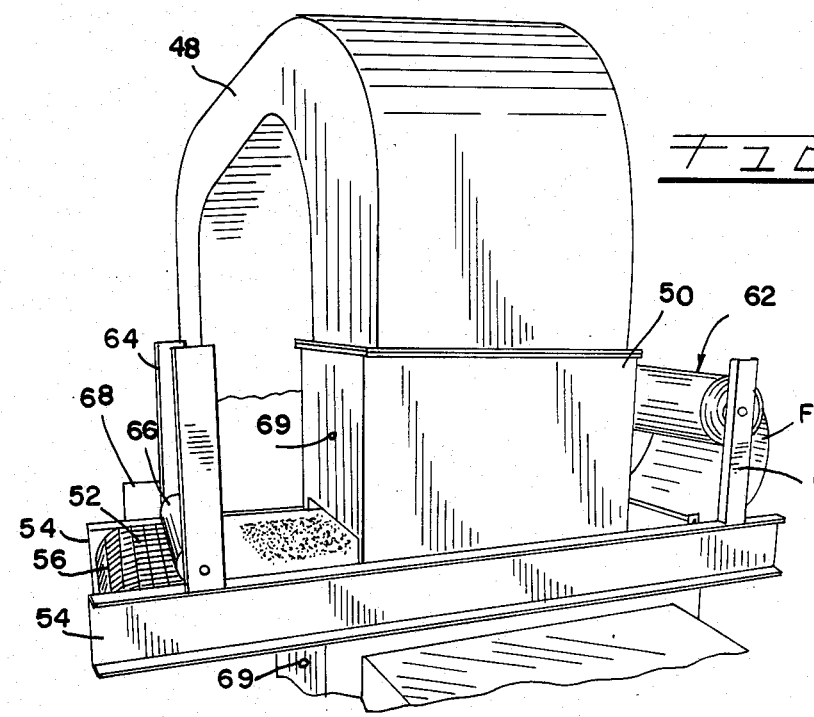

The air from outlet 24 of heat exchanger or condenser 10 is directed horizontally into a chamber 46 and then again directed vertically into a generally U-shaped conduit or deflector 48, which reverses the air flow 180° and again directs it downwardly into the upper inlet end 50 of a filtering unit 12. The filtering unit 12 or mist coalescing means is illustrated in greater detail in FIG. 3 and includes a filter support bed 52 extending horizontally below the inlet 50. The filter support bed 52 is in the form of an endless chain belt 53 supported at opposite ends of support frame elements 54 on pulleys or rollers 56.

A pair of brackets 60 extend vertically on one end of the support frame elements 54 for supporting a supply or roll 62 of filter material F. A further pair of brackets 64 extend upwardly from the opposite end of frame elements 54 and support a take-up roll 66. The chain roller 56 and the take-up roller 66 are driven by a suitable drive motor 68 to periodically advance the filter bed to replace the filter section below the inlet chamber with a new filter section from the supply roll 62. This operation of the motor may be controlled through a suitable pressure-sensing means 69 connected to a motor control (not shown) for either sensing the pressure differential across the filter section aligned with the inlet chamber 50 or sensing the pressure build-up in the inlet chamber so that a new filter section is moved into the chamber whenever the pressure differential reaches a predetermined level.

According to one aspect of the present invention, the filter F is a specially-constructed fibrous web specifically designed for coalescing the organic solvent aerosol particles from the exhaust stream into liquid form. In a preferred embodiment, the web fibers are polyester, polypropylene, nylon or glass, that have an average diameter of about 11 to about 40 microns, and the fibers of the web are bonded to each other predominantly at places of fiber-to-fiber contact with the longest dimension of the fibers being substantially within the plane of the web, so that the elongated dimension of the fibers is normal to the direction of flow of the exhaust stream through the web. Preferably, the filter has a weight in the range of about 5 ounces per square yard to about 28 ounces per square yard, and has a thickness in the range of about 3/32 to ⅜ inch. Actual practice has shown that a filter constructed in accordance with the details described above has proven to remove more than 97% of the vaporized organic solids and fine particulate matter from the exhaust stream in the filtering unit 12.

The aerosol particles that are collected on the filter F form into liquid droplets, which fall, again by the aid of gravity and the flow of the exhaust stream, into the lower portion of the filter unit, where they may be removed as will be described later.

The exhaust stream passing through the filter F is again directed horizontally through a suitable deflector (not shown) and may be directed through one or more mist-eliminators 70. One mist-eliminator 70 is shown in fragmentary section in FIG. 1 and includes a housing 72 that defines an elongated horizontal chamber, which has one or more porous metal mesh plates 74 that are inclined with respect to the horizontal flow-path for the exhaust stream so that any liquid in the exhaust stream will have a tendency to collect on the metal plates 74 and drop by gravity into the lower portion of the chamber 72.

In order to produce the desired flow through the filtering unit 12, a fan 80 is preferably located on the downstream side of the filter unit and, in the embodiment shown in FIG. 1, this fan is located downstream of the mist-eliminator 70. This fan may be utilized to control the flow of the exhaust stream through the system. The outlet of the exhaust fan 80 may be, if desired, connected to a second mist-eliminator 82 where any remaining mist is removed for the exhaust stream before it enters the exhaust stack and exits from the plant.

In certain instances, the exhaust stream may also have certain odors which should be removed from the exhaust stream before it is delivered to the atmosphere. For this purpose, a second movable filter bed 86 is provided above the second mist-eliminator 82 and may be in the form of an endless chain supported bed, similar to that shown in FIG. 3, which will support an activated-charcoal filter unit that is designed to remove any odors from the exhaust stream. The activated-charcoal filter may be formed from a base material that is a non-woven polyester, which is coated with activated carbon of up to 300–350% by weight of the base material. The activated-charcoal is a commercially-available substance that is first mixed into a blend to form a stable dispersion. The solid contents and viscosity in the dispersion are controlled according to the substrate that is being impregnated and the base substrate is then coated with the dispersion by passing it through the dispersion in the dip-tank where the activated-carbon is picked up by the base substrate and the amount thereof may be controlled with a squeegee roller (not shown). Again, the charcoal filter can be automatically replaced with a new filter section in a manner similar to the filter bed described above.

Figure 2:
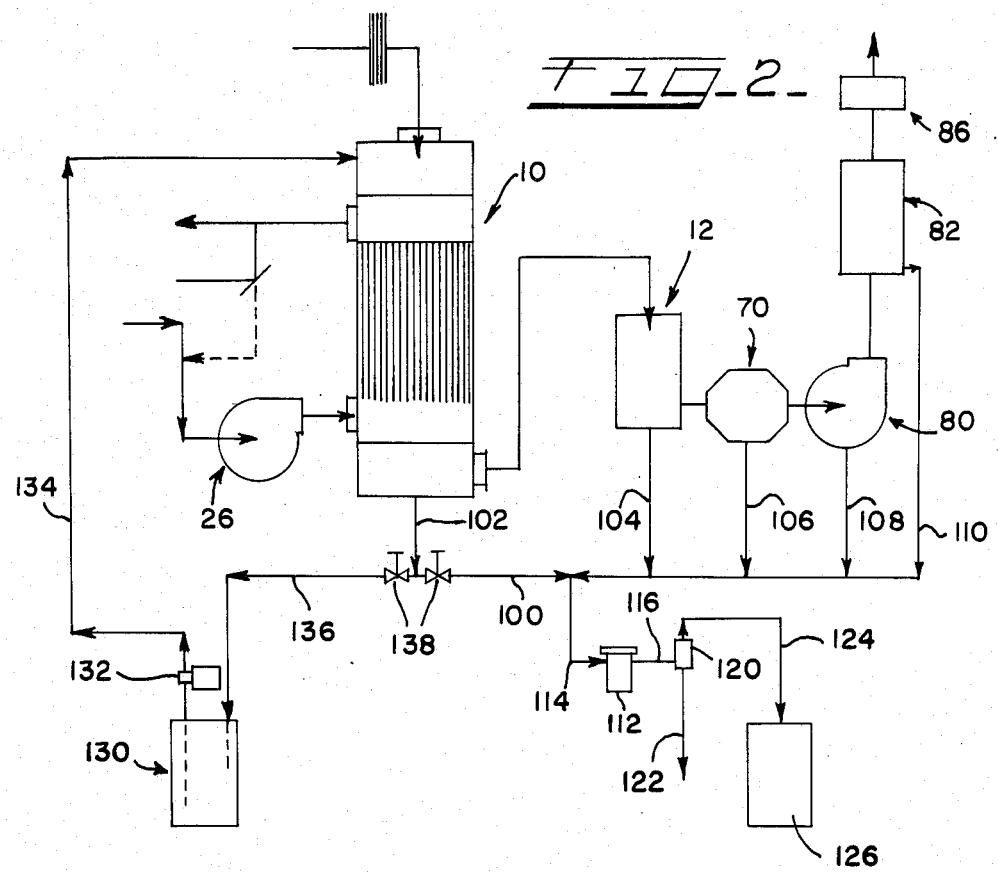

Referring now to FIG. 2, a schematic illustration of the flow of the exhaust gases, along with the atmospheric cooling air and a solvent-recovery system, is disclosed. As shown therein, the lower end of the heat exchanger 10, the filter unit 12, the mist-eliminator 70, the blower 80 and the mist-eliminator 82 are all connected to a common conduit 100 through conduits 102, 104, 106, 108 and 110. This common conduit 100 is connected to the inlet end of a strainer 112 by a conduit 114. Strainer 112 is designed to remove solid particulate matter from the solvent and may be in the form of a traveling bed paper-type filter arrangement. The outlet of strainer 112 is connected by a conduit 116 to a solvent-separator 120, which separate the solvents from the water by gravity that may be mixed in with the removed solvents and the water is drained through a conduit 122 while the solvents are delivered through conduit 124 to a solvent-collection tank 126. Thus, all of the solvents removed by the entire system can be re-used, if desired, which, along with the heated air recovery, considerably reduces the overall cost of operation and maintenance of the unit of this type.

According to another aspect of the invention, the system also incorporates a cleaning means for cleaning the plates in the heat exchanger or condenser 10. This cleaning means is in the form of a tank 130 having cleaning solution therein and connected to a pump 132, which in turn is connected through a conduit 134 to the upper end of the condenser 10. The lower end of condenser 10 is connected through conduit 102 and a branch conduit 136 to the cleaning solution tank 130. Suitable valves 138 are located on opposite sides of the conduit 102 so that the heat exchanger and cleaning system can be isolated when desired. The cleaning solution system is designed to remove any accumulated materials, particuarly on the plates 22. At all other times, the valves are positioned such that any flow of liquid through conduit 102 will be delivered to the strainer 112.

I claim:

1. Apparatus for filtering vaporized organic solvents and fine particulate matter from a hot exhaust stream comprising a condenser and a filter unit; said condenser including a housing having an upper inlet and a lower outlet for said exhaust stream, baffle means within said housing defining a plurality of individual vertical flow paths with said exhaust stream communicating with an upper end of alternating flow paths and flowing downward to said lower outlet, an atmospheric pressurized fluid source in communication with the lower ends of the remaining flow paths and flowing upward to a heated fluid exit adjacent the upper end of said housing for cooling said exhaust gases and condensing said vaporized organic solvents into at least an aerosol particle mist, said filtering unit including a substantially vertical housing having an upper inlet and a lower outlet, a movable filter support bed extending across said housing and a mist-coalescing filter supported on said bed, and conduit means extending from said lower outlet of said condenser to said upper inlet of said vertical housing so that said exhaust stream flows downward through said mist-coalescing filter; pressure sensitive means for sensing the pressure differential of said exhaust stream across said mist-coalescing filter and drive means connected to said filter support bed for moving a new filter section across said vertical housing when the pressure differential exceeds a certain level with a fan downstream of said filter unit for drawing said exhaust stream through said filter unit; and a movable charcoal filter extending across said exhaust stream downstream of said fan for removing odors from said exhaust stream.

2. A method of removing contaminants in a vaporized phase from heated exhaust gases comprising the steps of moving the exhaust gases downwardly in a heat exchanger while flowing air upward in said heat exchanger to cool said exhaust gases to a preset temperature and condense said contaminants from the vaporized phase to a liquid phase while some of the condensed contaminants are collected in a lower portion of the heat exchanger, drawing said exhaust gases downwardly through a filter section with a fan to further remove condensed contaminants from said exhaust gases which are now changed from gas phase to an aerosol liquid particulate form, and introducing a movable charcoal filter across said exhaust gases downstream of said fan to remove odors from said gases.

3. The method as defined in claim 2, including the further step of sensing the temperature of the air entering the heat exchanger and mixing heated air exiting from the heat exchanger with the entering air to maintain a predetermined minimum temperature.

4. The method as defined in claim 2, in which said filter section has a filter media having a material thickness in the range of about 3/32 to about ⅜ inch and a weight in the range of about 5 to about 28 ounces per square yard and formed from fibers having an average fiber size in the range of about 11 to about 40 microns, thereby removing more than 95% of the liquid and solid particulate matter of less than one micron in size.

5. The method as defined in claim 2, including the further step of introducing a mist-eliminator across the gas stream between the filter section and the fan.

6. The method as defined in claim 2, in which said preset temperature is less than 100° F.

* * * * *

REEXAMINATION CERTIFICATE (1191st)

United States Patent [19]

Tandon

[11] B1 4,662,899

[45] Certificate Issued  Jan. 16, 1990

[54] AIR POLLUTION CONTROL SYSTEM METHOD AND APPARATUS

[75] Inventor: Jag S. Tandon, Northbrook, Ill.

[73] Assignee: American Environmental International Inc.

Reexamination Request:
No. 90/001,796, Jun. 22, 1989

Reexamination Certificate for:
Patent No.: 4,662,899
Issued: May 5, 1987
Appl. No.: 720,100
Filed: Apr. 5, 1985

[51] Int. Cl.⁴ .................................. B01D 51/10
[52] U.S. Cl. .............................. 55/80; 55/97; 55/213; 55/268; 55/316; 165/909
[58] Field of Search ............... 55/80, 84, 89, 97, 185, 55/186, 213, 261, 264, 268, 316, 528; 165/901, 913, 909, 111

[56] References Cited

U.S. PATENT DOCUMENTS

| | | | |
|---|---|---|---|
| 2,626,012 | 1/1953 | Persons | 183/62 |
| 2,838,287 | 6/1958 | Kuhner | 257/224 |
| 3,100,146 | 8/1963 | Huntington | 55/9 |
| 3,363,681 | 1/1968 | Revilock et al. | 165/166 |
| 3,435,593 | 4/1969 | Nordone | 55/84 |
| 3,477,203 | 11/1969 | Luge et al. | 55/9 |
| 3,745,748 | 7/1973 | Goldfield et al. | 55/97 |
| 3,834,130 | 9/1974 | Bissada et al. | 55/316 |
| 3,905,784 | 9/1975 | Kelleher et al. | 55/31 |
| 4,078,390 | 3/1978 | Duvall | 62/11 |
| 4,194,945 | 3/1980 | Malev et al. | 162/135 |
| 4,239,511 | 12/1980 | Austermuhle | 55/84 |
| 4,257,783 | 3/1981 | Gutjahr et al. | 55/61 |

OTHER PUBLICATIONS

Sohr, R. T.; "Tywood Industries Limited: A Fueless Air Pollution Control System for the Printing and Lithographic Industries," 1981; 10 pages.

Anderson 2000 Inc.; "Anderson 2000 Inc. Heat Gas Filtration Equipment," 1976; 19 pages.

"Controlling Heatset Emissions,"; High Volume Printing, Apr./May 1984; pp. 61, 62.

Giencke, James; "Firm Opts for Condensor/Filter Pollution Control," HVP (High Volume Printing); Oct.-/Nov. 1985; p. 45.

Wissinger, Jack; "Maintenance and Operating Costs Figured in Analysis of Best Air Emissions Control System," High Volume Printing; Apr./May 1985; p. 67.

Warring; "Filter and Filtration Handbook," 1981; pp. 218-220; 408-409.

Brochure entitled "Tywood: The Tywood Filter PR-37 System," May 4, 1982.

Sheet entitled "1981 PE 5 Star Award: presented to MMT Environmental Products for Significant Advancement in Environmental Control Technology, Awarded by Pollution Engineering Magazine, Sep. 22, 1981".

Sheet from "Pollution Engineering" publication; Sep. 1981; pp. 39-40.

Letter dated Nov. 10, 1989, from Henry E. Friedrich, Senior Application Engineer, MMT Environmental, Inc.

Brochure entitled "A Primer for Heatset Pollution Control," MMT Environmental, Inc.

Sheet from "The County Scanner," Nov. 1980, vol. 4; entitled Pollution Fighter of the Month.

Brochure entitled "Condenser/Filter Systems from MMT Environmental," MMT Environmental, Inc.

Primary Examiner—Charles Hart

[57] ABSTRACT

A pollution control system includes a condenser and filtering unit for removing vaporized organic solvents and particulate matter. The condenser includes baffles that define vertical flow paths, and hot exhaust gases are directed from above to alternate flow paths to flow downward while atmospheric air is directed upwardly through the remaining flow paths to cool the exhaust gses and the heated air is used to maintain the atmospheric air above a selected temperature. The filter unit includes a horizontal movable filter which is automatically replaced with a new filter section when the pressure differential across the filter exceeds a certain level.

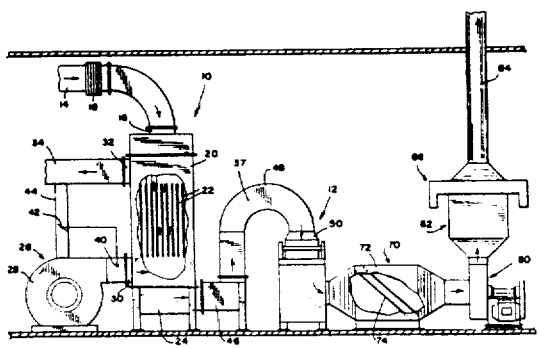

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 6 is confirmed.

* * * * *